(12) United States Patent
Fiedel et al.

(10) Patent No.: US 9,292,341 B2
(45) Date of Patent: Mar. 22, 2016

(54) RPC ACCELERATION BASED ON PREVIOUSLY MEMORIZED FLOWS

(71) Applicant: GOOGLE INC., Mountain View, CA (US)

(72) Inventors: Noah Fiedel, Mountain View, CA (US); Jeremy Nelson, Ultimo (AU)

(73) Assignee: GOOGLE INC., Mountain View, CA (US)

( * ) Notice: Subject to any disclaimer, the term of this patent is extended or adjusted under 35 U.S.C. 154(b) by 49 days.

(21) Appl. No.: 14/055,463

(22) Filed: Oct. 16, 2013

(65) Prior Publication Data

US 2015/0106827 A1    Apr. 16, 2015

(51) Int. Cl.
*G06F 9/48*    (2006.01)
*G06F 9/54*    (2006.01)

(52) U.S. Cl.
CPC .............. *G06F 9/4843* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 8,010,954 B2 * | 8/2011 | Little et al. | 717/149 |
| 2009/0106219 A1 * | 4/2009 | Belknap et al. | 707/4 |
| 2009/0319600 A1 * | 12/2009 | Sedan et al. | 709/203 |
| 2010/0242055 A1 * | 9/2010 | Aguilera et al. | 719/330 |
| 2013/0159719 A1 * | 6/2013 | Ha et al. | 713/176 |

FOREIGN PATENT DOCUMENTS

EP    0 961 210 A1    12/1999

OTHER PUBLICATIONS

Ren Q., Dunham M. H., Kumar V., "Semantic Caching & Query Processing," IEEE Transactions on Knowledge & Data Engineering 15:1:192-210 (Jan.-Feb. 2003).

* cited by examiner

*Primary Examiner* — Umut Onat
(74) *Attorney, Agent, or Firm* — Birch, Stewart, Kolasch & Birch, LLP

(57) ABSTRACT

Techniques for acceleration of remote procedure calls are disclosed. Such techniques include steps of receiving a content request, the content request including at least one data request for information from a database; analyzing the received content request; and determining whether the analyzed content request includes at least one data request that can be separately executed in parallel with execution of the received content request. In response to a determination that at least one data request that can be separately executed in parallel, initiating the execution of the parallel data request; receiving the requested data in response to that data request; locally storing the received requested data; and providing the stored received requested data in response to execution of the received content request.

11 Claims, 7 Drawing Sheets

| | |
|---|---|
| Request Signature 3001 | |
| Application ID 3010 | |
| Target Address 3020 | |
| First RPC 3030 | Target 3040 |
| Second RPC 3060 | Target 3050 |
| ⋮ | ⋮ |
| Nth RPC 3070 | Target 3080 |

Fig. 2

RPC ACCELERATION BASED ON PREVIOUSLY MEMORIZED FLOWS

BACKGROUND

Increasingly, in complex large-scale computing environments, dynamic user requests often result in many serialized RPCs to different backends. These RPCs are very expensive for engineers to optimize; optimizations add significant technical complexity and maintenance cost; and often add latency to systems.

Even with perfectly optimized hand-coding to parallelize a portion of these RPCs, they are still typically many serialized blocks of RPCs. This causes increased latency and the cost of mitigating said latency is very high in terms of engineering time and system complexity.

SUMMARY

Embodiments of solutions discussed herein may pertain to a system comprising: a processor; a processor-readable memory having stored therein instructions that cause the processor to perform a method comprising the steps of: receiving a content request, the content request including at least one data request for information from a database; analyzing the received content request; determining whether the analyzed content request includes at least one data request that can be separately executed in parallel with execution of the received content request; in response to a determination that the received content request includes at least one data request that can be separately executed in parallel with the received content request, initiating the execution of said at least one data request in parallel with execution of the received content request, said executing including sending said at least one data request to at least one database for execution; receiving requested data from said at least one database in response to said at least one data request; locally storing the received requested data; and providing the stored received requested data in response to said execution of the received content request.

In some embodiments, the content request includes two or more data requests for information from one or more databases, said two or more data requests including a first data request and a second data request.

In some embodiments, initiating the execution includes initiating the execution of the first data requests in parallel with the second data request and in parallel with the received content request.

In some embodiments, receiving requested data includes receiving requested data in response to the first data request and receiving requested data in response to the second data request.

In some embodiments, sending at least one data request to at least one database for execution includes sending said at least one data request to a data center.

In some embodiments, analyzing includes identifying all data requests included in the received content request.

In some embodiments, determining includes determining whether the identified data requests match a known or previously executed set of data requests associated with a known or previously executed content request.

In some embodiments, analyzing includes determining whether the received content request is substantially the same as a previously-executed received content request; and in response to a determination that the received content request is substantially the same as a previously-executed received content request, determining that the received content request includes at least one data request that can be separately executed in parallel with the received content request, and initiating the execution of those data requests associated with the previously-executed received content request in parallel with execution of the received content request.

In some embodiments, analyzing includes generating request signature based on the received content request.

In some embodiments, determining includes comparing the generated request signature to one or more known or previously-generated request signatures, the known or previously-generated request signatures each being associated with a set of one or more known or previously-executed data requests.

In some embodiments, the received content request includes information about an application originating the content request.

In some embodiments, the request signature is generated based on the information about the application originating the content request.

In some embodiments, determining includes comparing a result of said analyzing against one or more known or previous analysis results, each of said known or previous analysis results being associated with a set of one or more previously-executed data requests.

In some embodiments, the known or previous analysis results are stored in said processor-readable memory.

Embodiments of techniques and solutions described herein may pertain to a method comprising some or all of the steps described above. Embodiments of techniques and solutions described herein may pertain to a computer-readable medium, such as an electric, magnetic or optical storage medium or a carrier wave, having instructions for performing some or all of the above-described method steps embodied thereon or therein.

Embodiments of techniques and solutions described herein may pertain to system comprising: a processor; a processor-readable memory having stored therein instructions that cause the processor to perform a method comprising the steps of: receiving a request for content from a requesting entity; generating a request fingerprint based on the received request for content; first determining whether the generated request fingerprint matches a stored request fingerprint; in response to a determination that the generated request fingerprint matches the stored request fingerprint, initiating the remote procedure calls associated with that stored request fingerprint in parallel; serially executing remote procedure calls associated with the received request after said first determining step, said serially executing including, for each of the remote procedure calls being serially executed attaching a result stub to the remote procedure call, the result stub representing a placeholder for a result of one of the remote procedure calls executed in parallel; determining whether said one of the remote procedure calls executed in parallel has completed execution; in response to a determination that said one of the remote procedure calls executed in parallel has completed execution, returning a result of said one of the remote procedure calls executed in parallel has completed execution to the result stub; and in response to a determination that said one of the remote procedure calls executed in parallel has not completed execution, suspending serial execution of the remote procedure call until said one of the remote procedure calls executed in parallel has completed execution and returning a result of the completed one of the remote procedure calls executed in parallel to the result stub; and in response to all of said serially executed remote procedure calls having a result, returning a request result to the requesting entity based on the remote procedure call results.

Further scope of applicability of the systems and methods discussed will become apparent from the detailed description given hereinafter. However, it should be understood that the detailed description and specific examples, while indicating embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings that are given by way of illustration only and thus are not limitative.

FIG. 2 shows a block diagram representing an embodiment of an RPC signature as described herein;

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

Figure 1A:
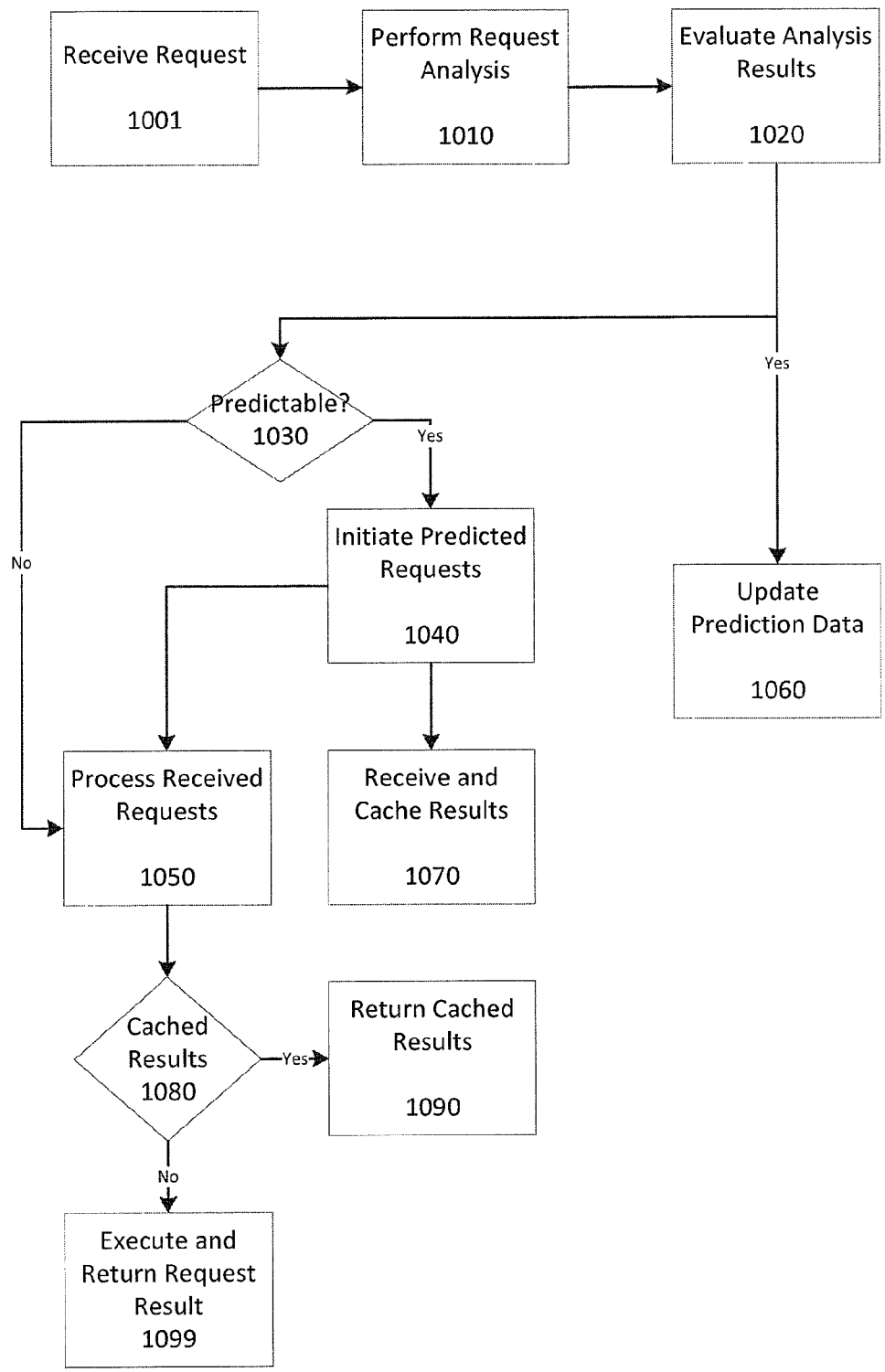
FIG. 1a shows a block diagram representing an embodiment of an RPC acceleration operation as described herein.

Techniques and systems disclosed herein pertain to devices and methods meant to instrument requests on a running system, learning the patterns of inbound requests (client Remote Procedure Calls—RPCs) as well as dependent RPC request flows (downstream or fanned-out RPCs). The learning could be heuristic based, regression based, or memorization based. An embodiment of a workflow depicting an instrumented request interception and RPC automation process is shown in FIG. 1a.

In the embodiment shown, a request may be received 1001 at, for example, a local web server. The web server may be equipped with hardware, software, or a combination thereof that performs analysis on the request 1010. Embodiments of such analysis may include heuristic analysis to match the request against known or expected patterns. Embodiments of such analysis may include a memo- or hash-based analysis to generate a signature or hash key based on the request and some or all of the data included therein or associated therewith.

The analysis results may then be evaluated 1020 to determine whether the web server or the RPC automation software or hardware included or associated therewith can predict 1030 the types of RPCs the request will require before the web server has fully processed the received request. The analysis results may also be used to update data used for future predictions 1060. Such data may include changing weights or thresholds associated with rules or estimation algorithms. In some embodiments, such data may include new or additional request signatures or hash keys for evaluating future requests.

In some embodiments, analyzing the request 1010 or evaluating the analysis results 1020 may also include making a determination as to whether the request is a candidate for RPC prediction or automation. In such embodiments, each analyzed request may be compared to a threshold amount of RPC calls or database queries to determine whether the request is a candidate for RPC automation as discussed herein.

If a request is determined to not be predictable 1030 or otherwise not a suitable candidate for RPC automation, the request may be processed normally 1050 with the various RPCs and/or database queries of the request processed in sequential order. If a request is determined to be predictable 1030 or otherwise a suitable candidate for RPC automation, a group of RPCs or database queries predicted or otherwise determined to be associated with the received request may be initiated 1040 in parallel. These RPCs and queries may go out to data centers and databases and data stores which then send results back to the system processing the initial request. The system, which may be a web server in some embodiments, receives and caches the results of the RPCs and queries 1070.

In some embodiments, after the parallel RPCs are initiated 1040, the web server may continue processing the incoming request normally 1050 as though the RPCs or queries therein will be sequentially addressed. However, upon encountering an RPC or query in the request, the system may first check to see if any cached results 1080 to that RPC or query are available based on the results received and cached 1070 from the initiated 1040 parallel RPCs and queries. If a cached result is available 1080, the cached result may be returned 1090 in response to the request, thereby eliminating or mitigating any latency that may otherwise be incurred by or associated with that request. If a cached result is not available 1080, the RPC or query from the request may be executed and a result thereof returned 1099.

The above-described embodiment relates to either heuristic- or memorization-based embodiments of an RPC automation system. A heuristic-based embodiment may include rules and rule sets that enable a system to determine or derive, based on an incoming RPC, what sorts of subsequent/additional/embedded RPCs may be included in, associated with, or following the incoming RPC. The determined or derived RPCs may then be triggered for execution before the subsequent/additional/embedded RPCs are processed and the results of those triggered RPCs may be cached locally at the system that received the incoming RPC. Thereby, when the actual subsequent/additional/embedded RPCs associated with the incoming RPC are processed by that system, the results of, for example, any database queries associated with those RPCs are already locally cached and available to be immediately provided in response to the RPC.

In a memorization-based embodiment, a system that receives incoming RPCs may record a signature of each inbound request. In some embodiments, requests may be analyzed to identify high-latency and/or RPC expensive queries. Embodiments of a recorded signature may include things like the user-id making the request, as well as components of the request such as a destination address (e.g. a website address/URL) and/or any target database(s). Using the recorded signature, it is possible to have an automated instrument all read-only (non-mutating) RPCs made downstream during a request, and write-back all required metadata to reproduce/re-invoke those RPCs at a later date, and cache said metadata using a key based on the request signature.

Whenever processing one of these expensive requests, the automated system may, in some embodiments, intercept the request, generate a request signature, look-up the cached/memorized downstream RPC metadata, and fire all downstream RPCs associated with that request signature in parallel. In some embodiments, such downstream RPC execution may be realized before the normal application control-flow was even invoked. In some such embodiments, the automated system may insert per-request stubs between the application control-flow and the downstream RPC calling code. In some such embodiments, whenever the application code creates or causes a new RPC, the automated system may be configured to intercept that RPC. If the captured RPC matches one of the already triggered & parallel RPCs, the automated system may then simply attach that already-existing RPC and results to the application RPC stub.

Figure 1B:
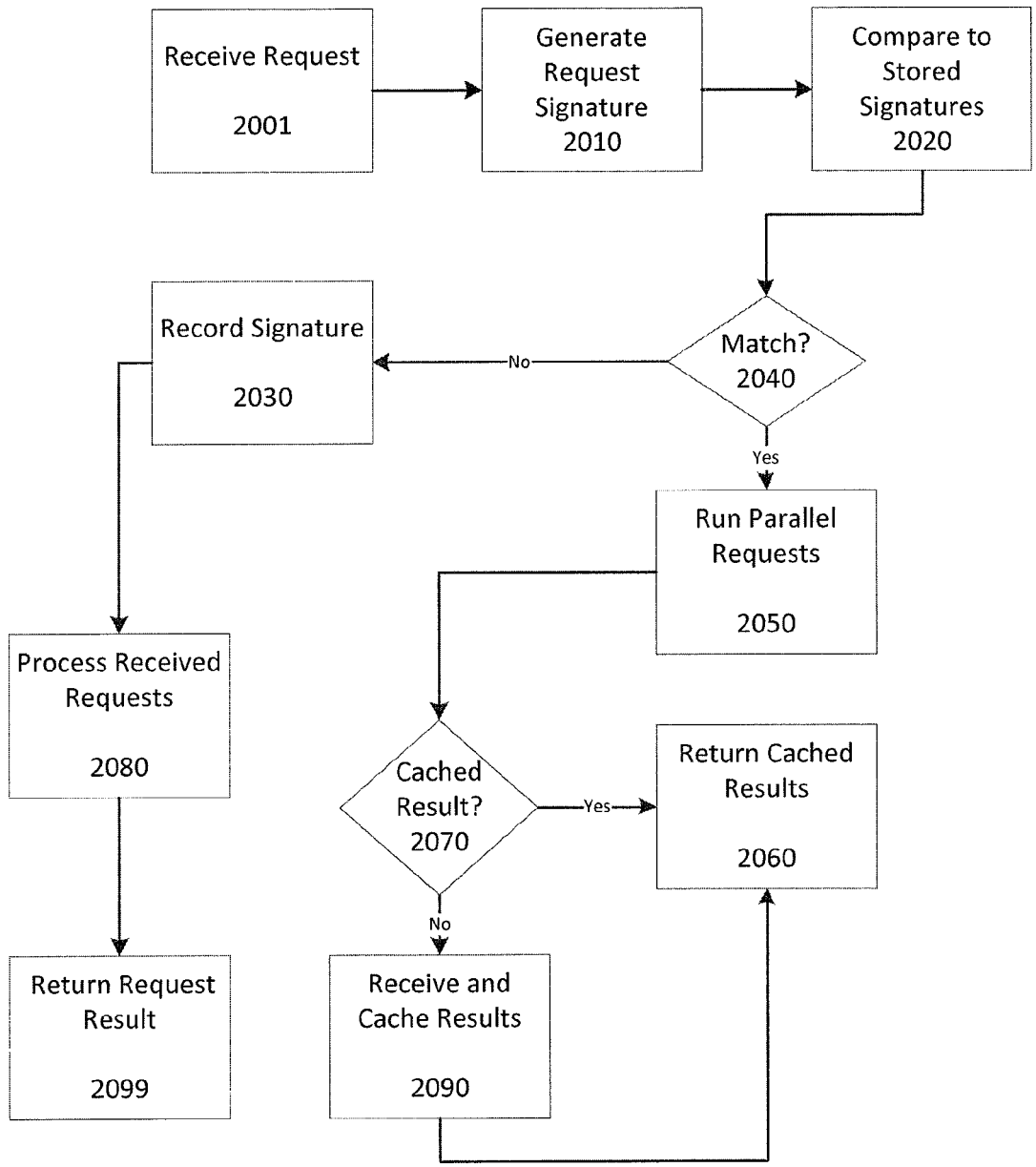
FIG. 1b shows a block diagram representing an embodiment of an RPC acceleration operation as described herein.

An embodiment of a workflow depicting a memorization-based embodiment an instrumented request interception and RPC automation process is shown in FIG. 1b. In the embodiment shown, after a request is received 2001 by, for example, a web server, specialized software or hardware or a combination thereof operating on or associated with the web server may generate a request signature 2010 from the received request. In some embodiments, specialized software may be operating on a separate computer system that the web server exchanges data with. In some embodiments, the web server and the specialized software for RPC automation may both be represented as part or all of one or more virtual or logical computing devices operating on one or more physical data processing platforms. Although described with respect to a web server, embodiments of the techniques and solutions described herein may be applicable to any software or hardware making RPC calls to a back-end or to stand-alone or client applications or systems.

The generated request signature may represent a memo or hash value based on the received request and any attribute of the received request, such as, for example, parameters thereof. In some embodiments, request attributes may include an IP or MAC address of a requesting device, headers, or parameters such as an identifier of a user account and/or an originating device associated with the request. Examples of an originating device may include a mobile data access device such as a tablet or smartphone or a computing device such as a laptop or desktop computer or a physical or virtual server or cloud-based computing resource. In some embodiments, a request may include an attribute or parameter identifying an application originating the request. For example, a request originated from a particular web browser, game, or productivity application may have an attribute or parameter indicating that particular web browser, game, or productivity application as the originating application.

In some embodiments, a request signature may be generated by a hash function. In some embodiments, custom request-hash functions may be used to confine the key space to a small/reasonable size. E.g. a request with a parameter used for logging but not for any behavior of the request could have a custom hash function that does not include such a parameter. Embodiments of such hash functions can be completely custom, based on whitelisted parameters/attributes of a request, or based on a blacklist of parameters/attributes to exclude from the request hash.

After the request signature is generated 2010, the generated signature may be compared 2020 to stored or known request signatures. Each stored or known request signature may be associated with a particular set of RPCs or queries or a combination thereof. In some embodiments, a known request signature may be used as a database or data table key to retrieve a record indicating which RPCs and/or queries should be triggered by that request signature. In some embodiments, such a database or data table may be stored locally or accessed by the device receiving the incoming request.

If the generated request signature matches 2040 a known or stored request signature, the RPCs or queries associated with that know or stored signature may be executed at least partially in parallel 2050. In some embodiments, one or more unique RPCs associated with the matching request may be simultaneously triggered or otherwise executed without waiting for or being dependent on resolution of or results from a different RPC.

In some embodiments, a memorization process would have stored all applicable RPCs made in a previous request flow, even including, in some embodiments, those which are logically not triggered until after an earlier (serial) request is made. In some such embodiments, all RPCs included in a request may be started in parallel. In some embodiments, in order to allow for resource optimization and to provide request isolation across such memorized RPC sessions, there may be several modes of scheduling these RPCs. In one embodiment, all such RPCs may be run in parallel on asynchronous connections, with no blocking threads. In another embodiment, all such RPCs may be run in a threadpool. In some such embodiments, the outbound RPCs for a request can be isolated across inbound requests by rate-limiting or quotaing. For example, in a threadpool embodiment of size 100, each inbound request might only be able to schedule RPCs on 20 threads at a time with others blocking for available threads.

If the generated request signature does not match 2040 a known or stored request signature, that generated request signature may be recorded or otherwise stored 2030 for later use or retrieval. In some embodiments, only those signatures associated with requests exceeding a certain complexity threshold may be selected for storage or recordation. In some embodiments, the determination of whether to persist (cache) the outbound memorized RPC signatures may be done at the end (after completion) of an instrumented request. In some such embodiments, this allows for collection or creation of information about the number of RPCs, their durations, sizes, and other metadata. In some such embodiments, a complexity threshold may be established by setting a minimum number of outbound RPCs for which to memorize (store/cache) the request. In some embodiments, a minimum threshold of 2 outbound RPCs may be set as the complexity threshold. In such embodiments, any request with two or more outbound RPCs may be selected for storage or recordation to allow for subsequent instrumentation or acceleration using embodiments of the techniques described herein. Further embodiments may employ different thresholds or threshold ranges, such as, for example, a threshold range of 2 to 9 outbound RPCs.

In some embodiments, a request signature selected for recordation may also have its execution monitored to determine which RPCs or queries are associated with the request and any dependencies related thereto. In some embodiments, such execution monitoring may occur as part of, or in conjunction with, processing of the received request 2080 to return a request result 2099. In some embodiments, the request may be a request for a web page having content from a database included therein, and the returned request may be the web page populated with the database information.

In some embodiments, after triggering the parallel RPCs and/or queries, the system may start looking for cached results 2070 to provide in response to the received request. Once the results of the individual parallel-ly triggered RPCs are received and cached 2090, those cached results may be returned 2060 in response to the received request.

In some embodiments, such a solution is completely automatic, allowing it to perform more quickly and more accurately than human-written RPC parallelization code. Such automated RPC recording and parallelization techniques may allow for latency improvements in request execution and may also provide some level of isolation from cross-datacenter RPC latency during partial datacenter failures. Furthermore, some embodiments may allow for reductions in code/system complexity around managing complex parallelism data structures.

An embodiment of a block diagram depicting an embodiment of a data record including a request signature is shown in FIG. 2. In the embodiment shown, a data record such as one included in a data table or database, may include a request signature 3001. In some embodiments, such a request signature may be a primary key or similar data record retrieval or lookup value. The request signature may be a hash key represented as a numeric or alphanumeric sequence of values. In some embodiments, such a signature may have embedded therein information representing a user ID, application ID, and/or requesting device ID associated with the request. In such embodiments, the hash signature may provide a unique identifier for the request using a one-way hash that would render any information such as a user ID or requesting device ID unrecoverable from the request signature.

In some embodiments, a second identifier such as an application ID may be stored in the data record. In some embodiments, the application ID may identify whether the request represented by the record is from a first browser application associated with a first operating system or a second browser application associated with a second operating system. In some embodiments, a lookup key for the data record may be represented as a combination of the request signature 3001 and a second identifier such as the application ID 3010.

In some embodiments, the data record representing the request may also include information about a target address 3020, such as a web page URL or IP address associated with the request. In some embodiments, such target address 3020 information may be embedded in the request signature instead of being separately stored in the data record.

In some embodiments, the data record may also include a listing or record of the various and/or multiple RPCs 3030, 3060, 3070 or queries associated with the request. In some embodiments, each RPC or query of the request may be associated with, or otherwise include, information about a target back-end 3040, 3050, 3080 from which the data is to be queried or on which the RPC is to be executed. In some embodiments, a data record may have an arbitrary number of RPCs or queries.

Figure 3:
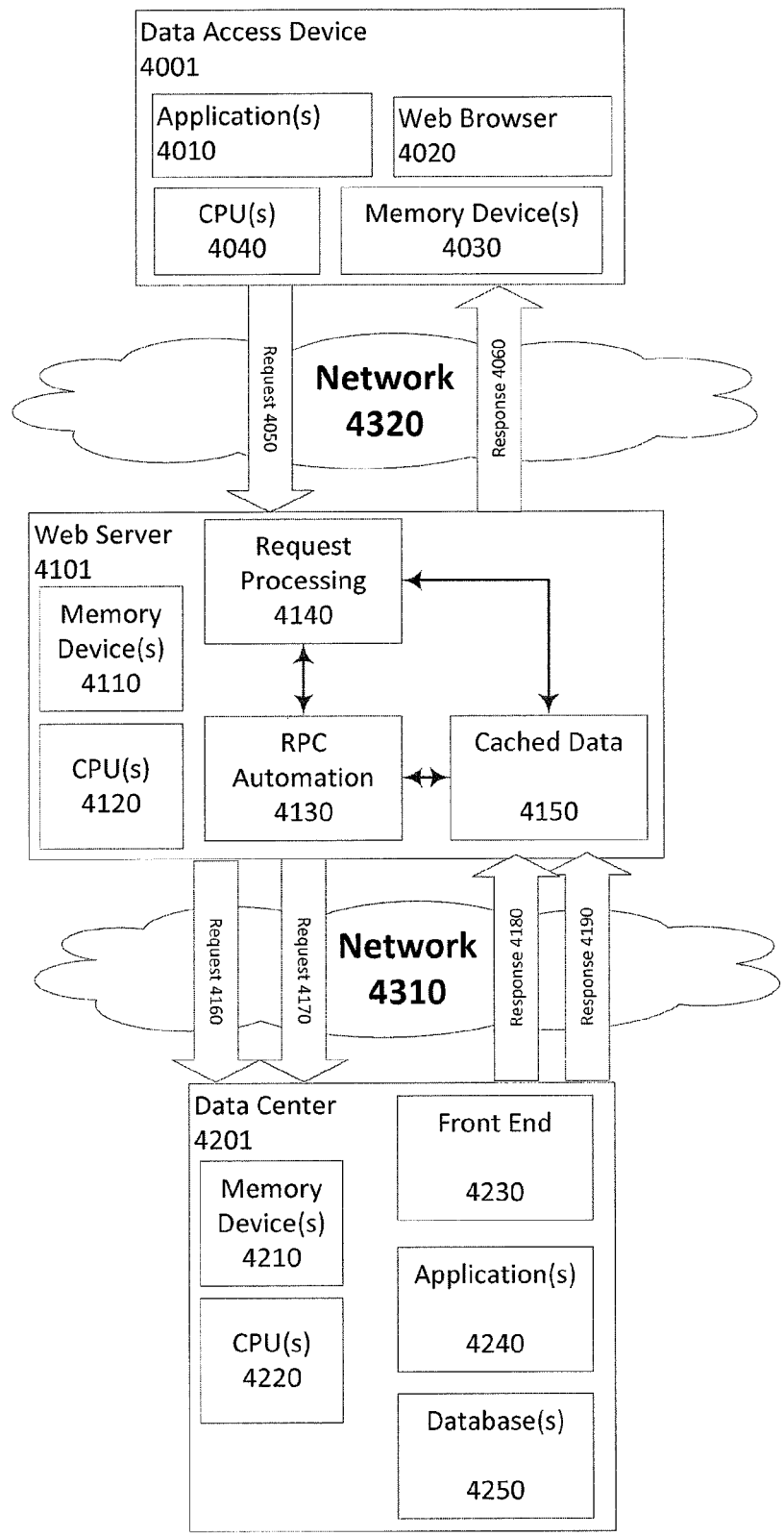
FIG. 3 shows a block diagram representing an embodiment of data flows between a data access device and a data center as described herein.

FIG. 3 depicts an embodiment of a web server equipped with RPC automation capability as described herein communication with a data access device and a data center. In the embodiment shown, a data access device 4001 such as a smartphone, tablet, laptop, desktop, or virtual computing resource may be equipped with or associated with one or more processors 4040 and some amount of volatile or non-volatile memory 4030 or some combination thereof. The data access device 4001 may be running or accessing one or more applications 4010 and/or a web browser 4020 or other network data access and exchange tool or interface.

The data access device may, via the application(s) 4010 or the web browser 4020 generate a request 4050 for content such as a request for a web page or a request for particular data. Such a request may be sent, via a network 4320, to a request processing device such as a web server 4101 (in the case of a request for a web page, for example). In some embodiments, the network 4320 may include or otherwise be connected to the Internet. In some embodiments the network may include a private network, a virtual private network, a cellular data network, a wired network, wireless data transmission, fiber-optic data transmission, or combinations thereof.

A request 4050 from the data access device 4001 may include or require one or more RPCs or queries to a database in order to provide the requested data or populate a web page. For embodiments related to web page requests, the request 4050 may be received by a web server 4101. Embodiments of a web server may include one or more physical or virtual computing devices equipped or associated with one or more processors 4120 and some amount of volatile or non-volatile memory 4110 or some combination thereof.

In some embodiments, the web server may be equipped with capabilities for request processing 4140 and RPC automation 4130 as described herein. Embodiments of a web server may also include a memory or data storage region where cached data 4150 may be kept.

In some embodiments, a received request 4050 may be intercepted at the web server 4101 by the RPC automation 4130 capability in order to determine whether, as the request is being processed by the request processing capability of the web server 4140 (or, in some embodiments, before request processing 4130 is even initiated), certain queries or RPCs can be identified and triggered in parallel before the request 4050 indicates a need for those queries of RPCs to be executed. In some embodiments, such RPC automation 4130 capability may cause multiple simultaneous or near-simultaneous requests 4160 4170 to be sent from the web server 4101 to one or more data centers 4201 via a communication link such as a network 4310.

In some embodiments, the network 4310 may include or otherwise be connected to the Internet. In some embodiments the network may include a private network, a virtual private network, a cellular data network, a wired network, wireless data transmission, fiber-optic data transmission, or combinations thereof. In some embodiments, the web server 4101 may be a virtual machine within a data center 4201.

In some embodiments, a data center 4201 may include a device, group of devices, or facility equipped with or including one or more processors 4220 and some amount of volatile and/or non-volatile memory 4210. The data center 4210 may include one or more front end features 4230 such as query or RPC interface(s), one or more application(s) 4240 running in the data center, and one or more database(s) or data tables 4250 storing information for use by and access from the data center 4201.

In some embodiments, the data center 4201 may receive the requests 4160 4170 from the web server 4210 via the front end 4230 and process the received requests through one or more applications 4240 to identify and retrieve desired information from one or more databases or data tables 4250. The retrieved information may then be provided to the web server 4101 in the form of one or more responses 4180 4190 sent from the data center via the network 4310. In some embodiments, the responses 4180 4190 may be stored at the web server 4101 as cached data 4150 represented a pre-emptively or predictively acquired response to a known or expected query or RPC associated with the request 4050 from the data access device 4001.

In some embodiments, such cached data may be received before or during processing of the request 4050 by the web server 4101. In some such embodiments, the request processing 4140 capability of the web server may be configured to check the cached data 4150 for a response or result to an RPC or query in the request 4050 before triggering that RPC or query for execution by a downstream data center 4201. The RPC or query result(s) may then be transmitted from the web server 4101 to the data access device 4001 as a response 4060 sent over the network 4320.

In some embodiments, such RPC automation may also provide the advantage of isolating the data access device 4101 from failures in local or remote data centers 4201. By triggering RPC requests predictively or pre-emptively at the web server 4101, delays and latencies associated with data center failures 4201 are masked from the data access device 4101. This is so because even if the data center 4201 does experience a failure with respect to any one RPC, the added latency of querying a different data center or different database will not impact any other RPCs because they are being executed in parallel as opposed to serially.

The advantage of isolation from partial failures in local datacenters, in a multi/distributed datacenter system, is significant. In an exemplary system making 10 serial RPCs to a local backend (say a database with a 10 ms response time), a healthy datacenter may process such requests with 10×10 ms=100 ms of RPC wait time. If however the local datacenter's backend is unhealthy, this may result in cross-datacenter RPCs. Assuming a 50 ms cross-datacenter response time (speed of light between DCs), an unhealthy backend can cause latency to increase from 100 ms of RPC wait time to 500 ms of RPC wait time. The automated system of request capture and automation provides an asymptotic speed-up in this case by making the 10 RPCs in parallel, so that even with cross-DC RPCs, the RPC wait time is only 60 ms (10 ms processing in parallel+50 ms cross-DC speed of light).

Figure 4:
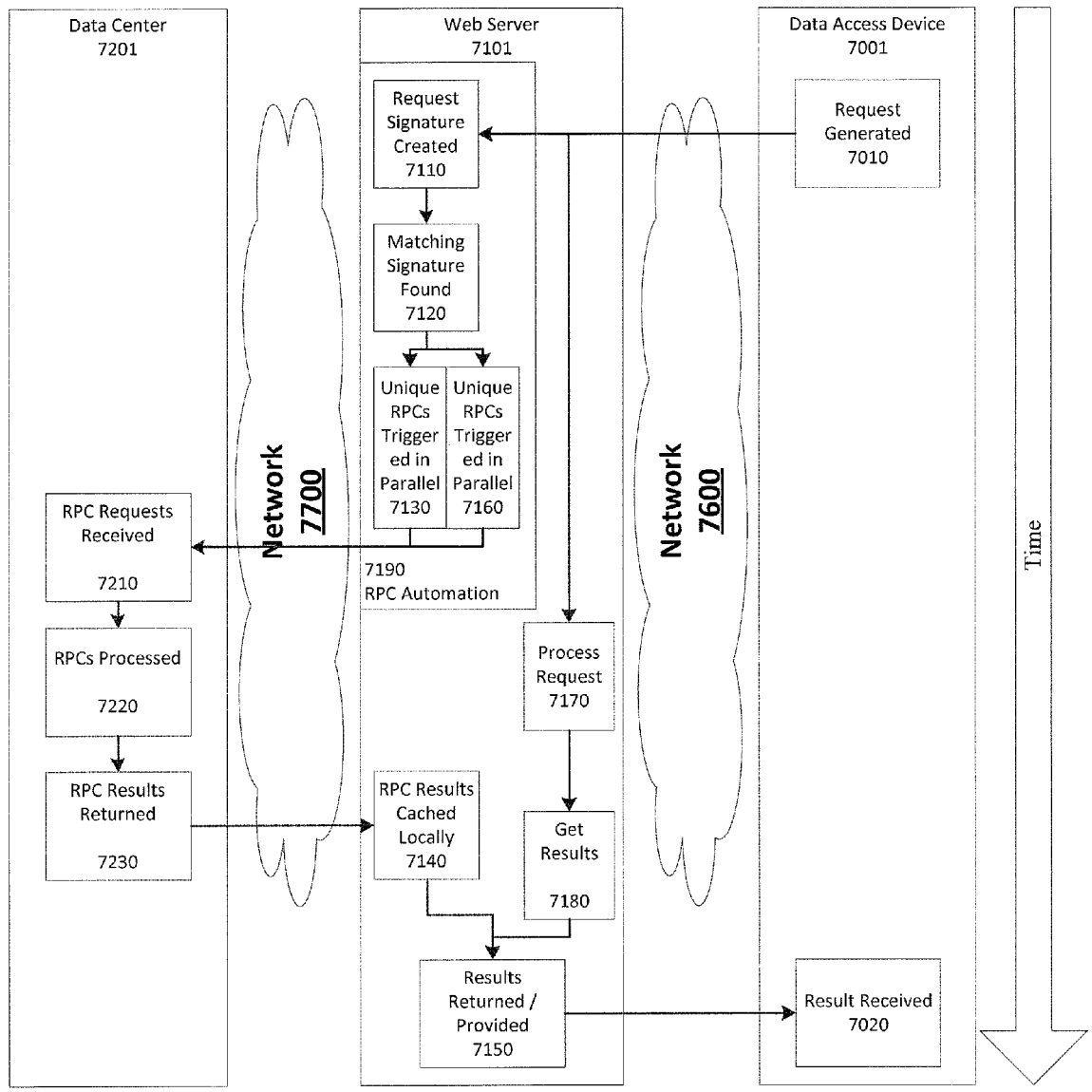
FIG. 4 shows a block diagram representing an embodiment of data flows between a data access device and a data center as described herein.

An embodiment showing data flows between a data access device and a data center as described herein is depicted in FIG. 4. In the embodiment shown, a data access device 7001 may generate a request 7010 for content that includes an RPC or database query. Such a request may be sent, in the case of a web page request, to a web server 7101 over a network 7600 as described above. Upon being received by or, in some embodiments, en-route to, the web server, the request may be intercepted by an RPC automation feature or capability 7190.

In some embodiments, such an RPC automation capability 7190 may generate a request signature 7110 based on the received or intercepted request from the data access device 7001. The request signature may then be compared against other request signatures stored by or accessible to the RPC automation capability 7190 to determine if the generated request signature matches a known or previous request signature. If a matching request signature is found 7120, a series of unique RPCs may be triggered in parallel 7130, 7160 based on the RPC associated with the matching signature. The triggered unique RPCs may be sent to one or more data center(s) 7201 via a network 7700 as described previously herein. The data center(s) 7201 may receive the RPC requests 7210 from the web server 7101 and process the RPCs accordingly 7220 before returning the requested result(s) 7230 to the web server 7101.

At or in conjunction with the web server 7101 the returned RPC results may be locally cached 7140. On a time scale in parallel with the actions governed by RPC automation capability 7190, the web server 7101 may process the received request 7170 and attempt to get or otherwise retrieve the requested RPC or query results thereof 7180. In some embodiments, before (or instead of) making an RPC request to a data center, the web server may look in the local cache to see if there is already a locally available RPC or query result. The RPC or query result(s) are then returned or otherwise provided 7150 from the web server 7101 to the data access device 7001, which receives the result(s) 7020 and presents or processes them further accordingly.

Figure 5:
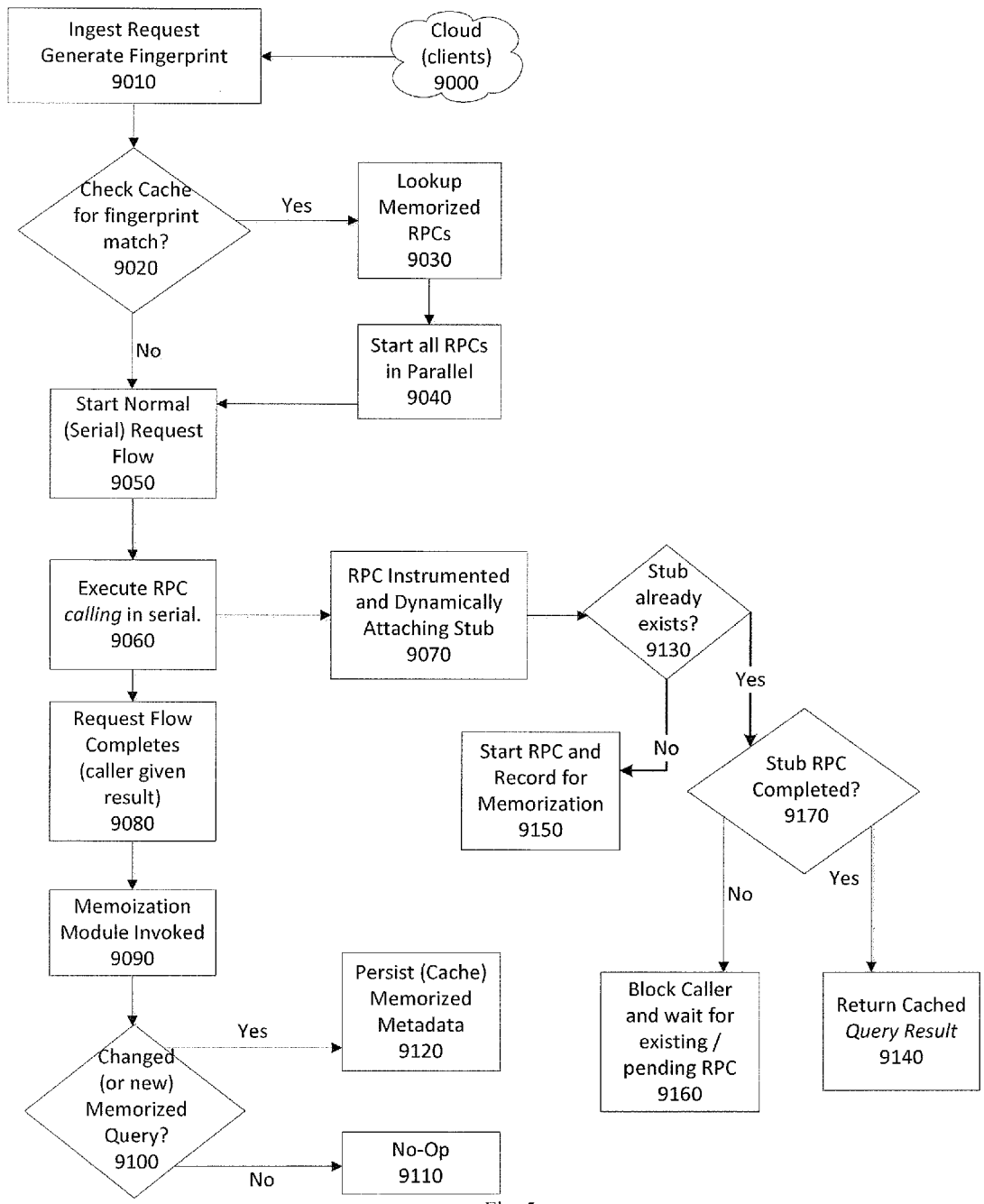
FIG. 5 shows a block diagram representing an embodiment of an RPC acceleration operation as described herein.

FIG. 5 depicts an embodiment of a process flow related to request generation and RPC automation as described herein. In the embodiment shown, one or more clients 9000 in a cloud computing environment may send requests to a request processing system. Such clients may include applications, physical devices, virtual devices, users, automated requests, and combinations thereof.

The request processing system may ingest or otherwise receive the request from the client and generate a request fingerprint 9010 therefrom. The generated fingerprint may be compared against a cache or store of previous or predetermined or known request fingerprints to determine if there is a match 9020. In the event there is a match, the request processing system may look up or otherwise access the memorized or predetermined or known set of RPCs associated with the matching request fingerprint 9030 and start all of those RPCs in parallel 9040.

In some embodiments, regardless of whether the request fingerprint matches a known or predetermined or previous request fingerprint, after the lookup and match operation 9020 is attempted, a serial or "normal" request flow may be initiated 9050. In such a request flow, the RPC calls in the request may be executed serially or sequentially 9060.

In some embodiments, each of the serially called RPCs may be instrumented and have a stub dynamically attached thereto 9070. This allows the serially called RPC to connect or otherwise be associated with one or more of the RPCs previously started in parallel 9040. In some embodiments, if the dynamically attached stub already exists 9130, a subsequent check may be performed to determine whether the parallel RPC associated with that stub has been completed 9170. In some embodiments the parallel RPC has not yet been completed, the parallel RPC call may be blocked or suspended and the serial RPC call may be allowed to execute or complete 9160. In some embodiments, the opposite may occur, with the parallel RPC being allowed to complete and the serially-called RPC being blocked or suspended until the parallel RPC, which has already been initiated, returns a result.

In some embodiments, the RPC stub 9130 may not yet exist because the RPC has not yet been initiated or because it was not included in the set of parallel RPCs. In such an embodiment, the RPC may be started and executed and, in some embodiments, the execution of the RPC may be recorded for memorization 9150 and later playback.

In some embodiments, the parallel RPC may already have completed 9170, in which case a cached query result may be returned 9140 to the dynamically attached stub, causing the serially-called RPC to be completed or otherwise fulfilled with previously acquired, cached data. In this manner, the RPC request flow may be completed and a result returned to the client 9080.

In some embodiments, after the request returns a result, a memorization module may be invoked 9090 to create a trace or record of the request for use for future automation or instrumentation of RPC-bearing requests. In some embodiments, the request is evaluated to determine whether it is a changed or new request or one that either matches a previously-recorded request signature 9100 or does not meet a complexity threshold. In some embodiments, a changed or new request may cause the creation and storage of memorized metadata 9120 representing the request and it's associated RPCs. In some embodiments, a request that is either not new/changed or under a complexity threshold may not trigger such memorization and storage of metadata, causing the system to instead do nothing 9110.

Although discussed above in terms of functionality, the features and properties of function graph generation and call path search may be realized through the use of one or more specialized, programmable, and/or specially programmed computing devices or portions thereof.

Figure 6:
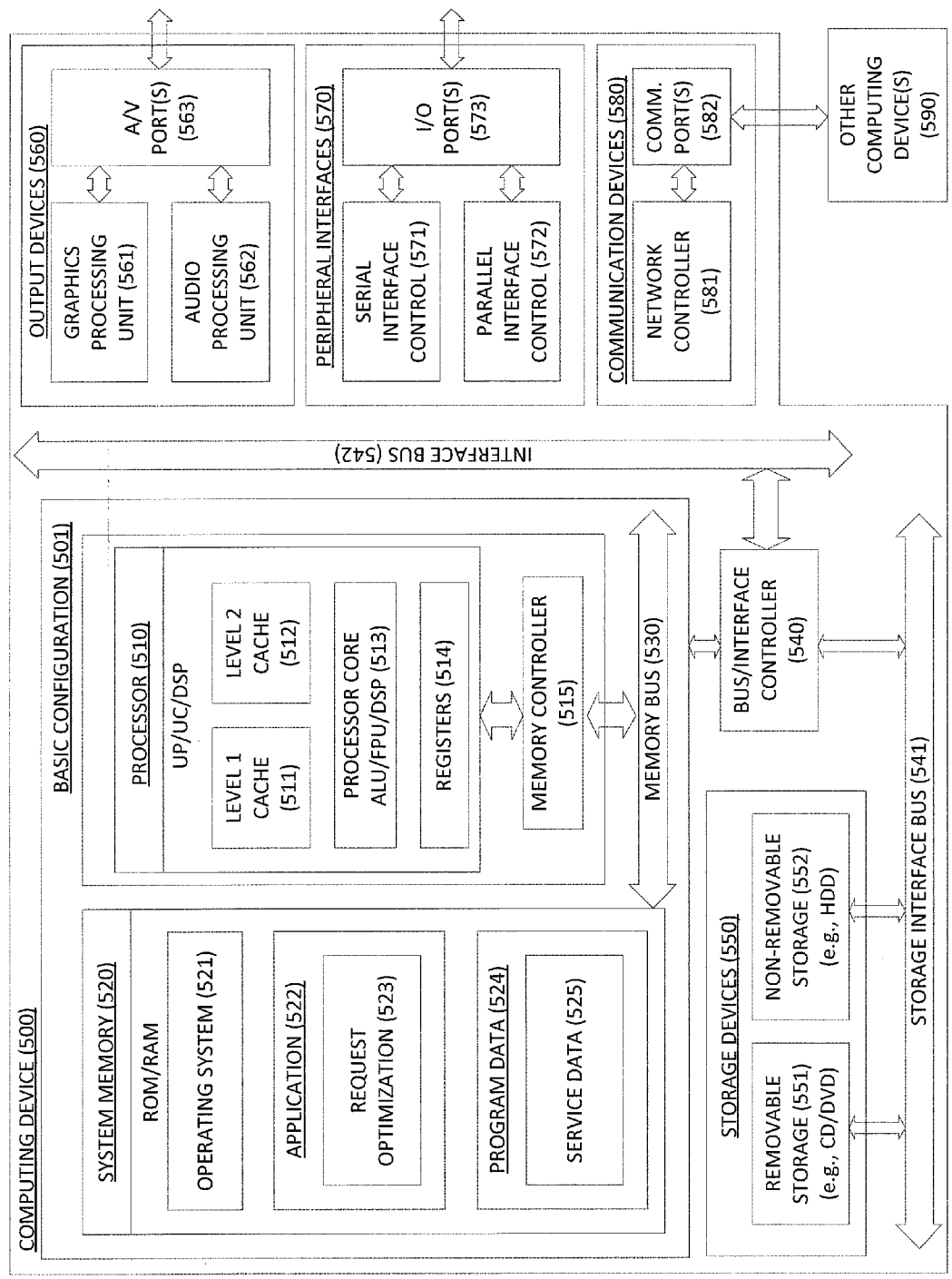
FIG. 6 shows a block diagram representing an embodiment of a computing device arranged to carry out some or all of the RPC acceleration or automation operations described herein.

FIG. 6 is a block diagram illustrating an example computing device 500 that is arranged to perform call graph generation and call path search techniques as described herein. In a very basic configuration 501, computing device 500 typically includes one or more processors 510 and system memory 520. A memory bus 530 can be used for communicating between the processor 510 and the system memory 520.

Depending on the desired configuration, processor 510 can be of any type including but not limited to a microprocessor (μP), a microcontroller (μC), a digital signal processor (DSP), or any combination thereof. Processor 510 can include one or more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes an operating system 521, one or more applications 522, and program data 524. Application 522 may include a call graph generation and/or call path search feature 523 as discussed herein. Program Data 524 includes location data such as one or more dependency lists or object name lists 525 that are useful for performing the desired operations as described above. In some embodiments, application 522 can be arranged to operate with program data 524 on an operating system 521 such that the overall system performs one or more specific variations of techniques as discussed herein. This described basic configuration is illustrated in FIG. 6 by those components within line 501.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, camera, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

In some cases, little distinction remains between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Only exemplary embodiments of the systems and solutions discussed herein are shown and described in the present disclosure. It is to be understood that the systems and solutions discussed herein are capable of use in various other combinations and environments and are capable of changes or modifications within the scope of the concepts as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the systems and solutions discussed herein, and all such modifications as would be obvious to one skilled in the art are intended to be included within the scope of the following claims:

The invention claimed is:

1. A system comprising:
   a processor;
   a processor-readable memory having stored therein instructions that cause the processor to perform a method comprising the steps of:
   receiving, at a web server, a content request from an access device;
   analyzing, at the web server, the received content request to determine whether the received content request is the same as a content request previously executed by the web server;
   in response to a determination that the received content request is not the same as a previously-executed content request,
      initiating serial execution of the received content request;
      create a trace or record of each processed remote procedure call; and
      store metadata representing the processed request and the created trace or record;
   in response to a determination that the received content request is the same as a previously-executed content request,
      identifying one or more remote procedure calls that can be separately executed in parallel with execution of the received content request based on the previously executed content request, and
      initiating the execution of said identified remote procedure calls in parallel with the serial execution of the received content request;
   locally caching, at the web server, data received in response to the parallel execution of the identified remote procedure calls; and
   providing the cached data to the access device in response to said serial execution of the received content request.

2. The system of claim 1, wherein the execution of said identified remote procedure calls includes sending at least one data request to at least one database at a data center for execution.

3. The system of claim 1, further comprising:
generating a request signature based on the received content request;
comparing the generated request signature to one or more known or previously-generated request signatures to determine whether the received content request is the same as a content request previously executed by the web server, the known or previously-generated request signatures each being associated with a set of one or more known or previously-executed remote procedure calls, and
using the set of one or more known or previously-executed remote procedure calls associated with the known or previously-generated request signature to identify one or more remote procedure calls that can be separately executed in parallel with execution of the received content request.

4. The system of claim 3, where the received content request includes information about an application originating the content request; and
where the request signature is generated based on the information about the application originating the content request.

5. A computer-implemented method comprising:
receiving, at a web server, a content request from a data access device;
generating a request signature from the received content request;
comparing the generated request signature to at least one known request signature, said known request signature being associated with at least one known remote procedure call;
in response to a determination that the generated request signature does not match any known request signature,
initiating serial execution of the received content request;
creating a trace or record of at least one processed remote procedure call; and
storing the generated request signature along with created trace or record;
in response to a determination that the generated request signature matches the known request signature,
initiating the execution of said at least one known remote procedure call associated with the known request signature in parallel with the serial execution of the received content request;
locally caching, in a processor-readable memory of the web server, data received in response to the parallel execution of the identified remote procedure call; and
providing the cached data to the access device in response to said serial execution of the received content request.

6. The method of claim 5, where the execution of said at least one known remote procedure call includes sending at least one data request to at least one database at a data center for execution.

7. The method of claim 5, wherein the generated request signature identifies all the remote procedure calls included in the received content request; and
the step of comparing includes determining whether the identified remote procedure calls match a known or previously executed set of remote procedure calls associated with a known request signature.

8. The method of claim 5, where the received content request includes information about an application originating the content request; and
where the request signature is generated based on the information about the application originating the content request.

9. The method of claim 5, where the step of comparing includes comparing the generated request signature against one or more known or previously-generated request signatures, each of said known or previously-generated request signatures being associated with a set of one or more previously-executed data requests.

10. The method of claim 9, where the known or previously-generated request signatures are stored in said processor-readable memory of the web server.

11. A system comprising:
a processor;
a processor-readable memory having stored therein instructions that cause the processor to perform a method comprising the steps of:
receiving a request for content from a requesting entity;
generating a request fingerprint based on the received request for content;
first determining whether the generated request fingerprint matches a stored request fingerprint, the stored fingerprint having a set of remote procedure calls associated with it;
in response to a determination that the generated request fingerprint does not match a stored request fingerprint,
initiating serial execution of the received content request;
creating a trace or record of at least one processed remote procedure call; and
storing the generated request fingerprint along with the created trace or record;
in response to a determination that the generated request fingerprint matches the stored request fingerprint,
initiating the remote procedure calls associated with that stored request fingerprint in parallel, and
locally caching data received in response to the parallel execution of the remote procedure calls;
serially executing the received request after said first determining step, said serial execution including, for each remote procedure call included in the received request,
attaching a result stub to the remote procedure call, the result stub representing a placeholder for a result of one of the remote procedure calls executed in parallel;
determining whether said one of the remote procedure calls executed in parallel has completed execution;
in response to a determination that said one of the remote procedure calls executed in parallel has completed execution, returning a result of said one of the remote procedure calls executed in parallel has completed execution to the result stub; and
in response to a determination that said one of the remote procedure calls executed in parallel has not completed execution, suspending serial execution of the remote procedure call until said one of the remote procedure calls executed in parallel has completed execution and returning a result of the completed one of the remote procedure calls executed in parallel to the result stub; and
in response to all of said serially executed remote procedure calls having a result, returning a request result to the requesting entity based on the remote procedure call results.

* * * * *